(12) United States Patent
Mummadl et al.

(10) Patent No.: US 11,232,188 B2
(45) Date of Patent: Jan. 25, 2022

(54) DYNAMICALLY DISPLAYING FEATURES IN A GRAPHICAL USER INTERFACE OF AN APPLICATION

(71) Applicant: VMware, Inc., Palo Alto, CA (US)

(72) Inventors: Raghavendra Mummadl, Atlanta, GA (US); David Jablonski, Acworth, GA (US); Gerard T. Murphy, Atlanta, GA (US); Soorya Rajasoorya, Palo Alto, CA (US); Adarsh Subhash Chandra Jain, Atlanta, GA (US); James Wells, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 149 days.

(21) Appl. No.: 16/395,728

(22) Filed: Apr. 26, 2019

(65) Prior Publication Data
US 2020/0342089 A1    Oct. 29, 2020

(51) Int. Cl.
| | |
|---|---|
| *G06F 21/41* | (2013.01) |
| *G06F 3/0483* | (2013.01) |
| *G06F 3/0481* | (2013.01) |

(52) U.S. Cl.
CPC ............ *G06F 21/41* (2013.01); *G06F 3/0483* (2013.01); *G06F 3/04817* (2013.01)

(58) Field of Classification Search
None
See application file for complete search history.

(56) References Cited

U.S. PATENT DOCUMENTS

| | | | |
|---|---|---|---|
| 7,600,042 B2 | 10/2009 | Lemson | |
| 10,339,423 B1 | 7/2019 | Dinerstein | |
| 2009/0063481 A1* | 3/2009 | Faus | ................. G06F 40/205 |
| 2009/0313318 A1 | 12/2009 | Dye | |
| 2012/0054875 A1* | 3/2012 | Antill | ................. G06F 8/65 726/28 |
| 2015/0020109 A1* | 1/2015 | Higa | ................. H04N 21/485 725/47 |

(Continued)

FOREIGN PATENT DOCUMENTS

KR    1020170127330    11/2017

OTHER PUBLICATIONS

International Search Report and Written Opinion, International Application No. PCT/US2020/014640, dated May 25, 2020.

*Primary Examiner* — Tuan S Nguyen
(74) *Attorney, Agent, or Firm* — Clayton, McKay & Bailey, PC

(57) ABSTRACT

Examples described herein include systems and methods for dynamically displaying features in a GUI of a portal application that facilitates access to other applications. An example method can include receiving a push notification, from a notification service, at a user device upon which the portal application is installed. The push notification can indicate that a new feature is available for the portal application executing on the user device. The example method can include requesting, from the management server, at least one command for modifying the GUI of the portal application. The management server can provide the command or provide instructions for the user device to retrieve the command. The method can include receiving at least one command. The method can also include modifying the GUI of the portal application based on the received command and displaying the modified GUI.

20 Claims, 7 Drawing Sheets

(56) References Cited

U.S. PATENT DOCUMENTS

| | | |
|---|---|---|
| 2015/0089617 A1 | 3/2015 | Sondhi |
| 2015/0186133 A1* | 7/2015 | Yarra ........................ G06F 8/65 |
| | | 717/121 |
| 2016/0248757 A1 | 8/2016 | Williams |
| 2016/0366119 A1* | 12/2016 | Rykowski ........... H04L 63/0815 |
| 2017/0094509 A1 | 3/2017 | Mistry |
| 2019/0230130 A1* | 7/2019 | Beckman ............ H04L 67/2823 |
| 2019/0347181 A1* | 11/2019 | Cranfill ................... G06F 9/541 |

* cited by examiner

DYNAMICALLY DISPLAYING FEATURES IN A GRAPHICAL USER INTERFACE OF AN APPLICATION

BACKGROUND

Many enterprises rely on applications to increase the efficiency of employees within the enterprise. Applications allow employees to access enterprise materials and perform work-related tasks from a variety of devices, including phones and tablet devices. Some applications are intended to perform a single purpose, such as invoice generation. Other applications, such as portal applications, provide access and authentication for a variety of other applications. Applications also can be customized to the user based on, for example, their role in the enterprise or their geographic location.

Traditionally, when an application is updated, the user is required to download the update in order to have it applied to the existing version of the application. This process typically requires user intervention and delays use of the application. In some cases, users must be reminded several times before they update their applications. Some users may not update their applications at all.

In the case of enterprise-managed applications, an administrator can control the availability of certain functions or features within the applications. The administrator can turn those functions on or off for particular users, or groups of users. But if the feature requires a substantial change to the application, such as by modifying the graphical user interface ("GUI"), then the application typically requires a full update. This can disrupt the user's workflow at the cost of productivity. In some cases, the user may not update the application and therefore would not be able to use the new features immediately.

As a result, a need exists for a system that dynamically displays features in a GUI of an application automatically and without requiring the user to stop working to perform the traditional application update.

SUMMARY

Examples described herein include systems and methods for dynamically displaying features in a GUI of a portal application. The portal application can be an application that facilitates access to other applications. For example, it can provide a catalogue of application icons corresponding to different applications that are available to the user. The applications can be applications downloadable to the user device or web-based applications, for example. The portal application can selectively show application icons for those applications available to or authorized for the user. It can also provide authentication across those applications, using single-sign-on ("SSO") techniques for example. An example portal application is VMWARE WORKSPACE ONE INTELLIGENT HUB.

An example method can include receiving a push notification, from a notification service, at a user device upon which the portal application is installed. The push notification can indicate that a new feature is available for the portal application executing on the user device. The push notification can be initiated by an administrator enabling the feature at a management server, such as by selecting the option through a console interface that is in communication with the management server.

The example method can include requesting, from the management server, at least one command for modifying the GUI of the portal application. The management server can provide the command or provide instructions for the user device to retrieve the command. The method can include receiving at least one command.

The method can also include modifying the GUI of the portal application based on the received command and displaying the modified GUI. For example, if the command requires the portal application to authenticate with an identity service, the portal application can modify the GUI by displaying an authentication page. In another example, if the command requires the portal application to provide access to a new catalogue or subset of applications, the portal application can modify the GUI to display the relevant application icons or catalogue option. The modification can also include displaying one or more informational or introductory pages or graphical elements to alert the user to the new features. In some examples, the user is required to agree to an end user license agreement ("EULA") or other agreement before the new GUI features are displayed by the portal application.

In examples where the modified GUI includes an authentication screen, the portal application can take the user's input and use it to request a token or certificate, such as an SSO token, that can be used to authenticate applications that are available through the portal application. Thereafter, when a user selects an icon through the portal application that is associated with an application requiring authentication with an identity service, the portal application can provide the SSO token to automatically authenticate the user without any input required from the user.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for dynamically displaying features in a GUI of a portal application that facilitates access to other applications. As explained above, the portal application can provide a catalogue of application icons corresponding to different applications that are available to the user. The user can launch an application by selecting an icon and, in some examples, the portal application can provide authentication for the selected application using SSO. The portal application can selectively show icons associated with applications—or with an entire catalogue of applications—available to the user. An example portal application is VMWARE WORKSPACE ONE INTELLIGENT HUB.

An example method can include receiving a push notification, from a notification service, at a user device upon which the portal application is installed. The push notification can indicate that a new feature is available for the portal application executing on the user device. The example method can include requesting, from the management server, at least one command for modifying the GUI of the portal application. The management server can provide the command or provide instructions for the user device to retrieve the command. The method can also include receiving at least one command. The method can also include modifying the GUI of the portal application based on the received command and displaying the modified GUI.

Figure 1:
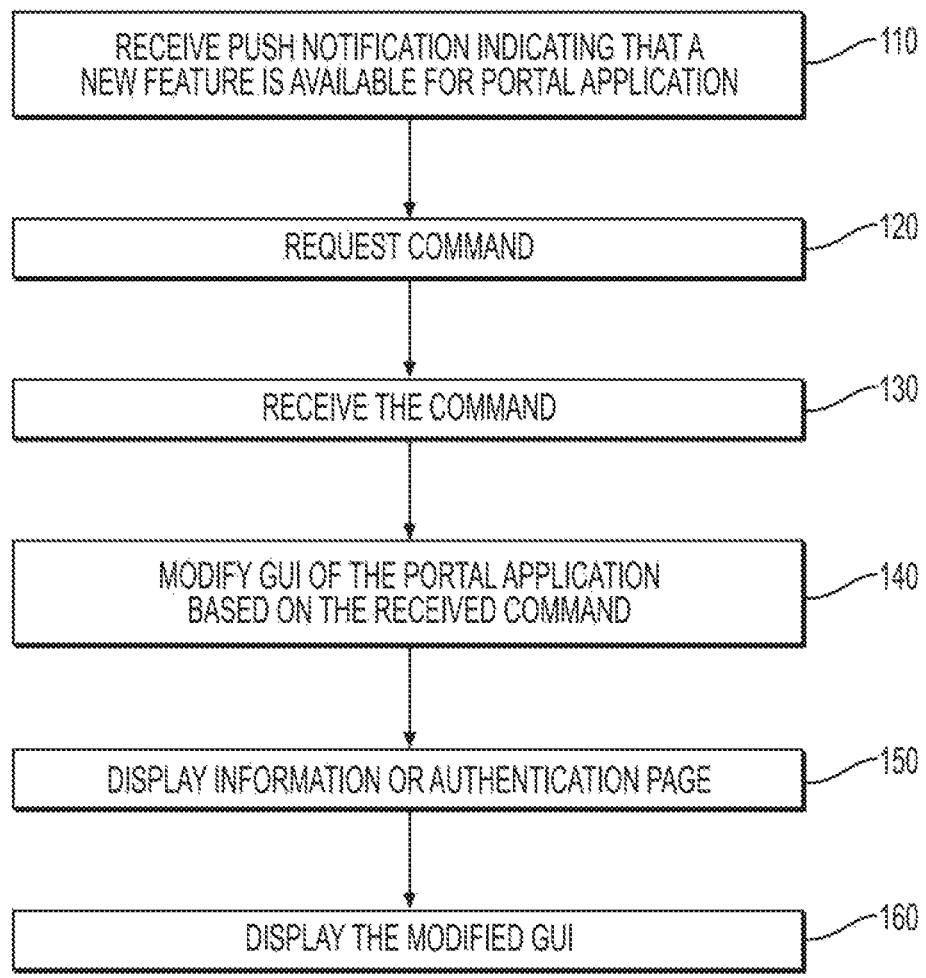
FIG. 1 is a flowchart of an example method for dynamically displaying features in a GUI of a portal application.

FIG. 1 provides a flowchart of an example method for dynamically displaying features in a GUI of a portal application. Stage 110 of the example method can include receiving a push notification indicating that a new feature is available for the portal application. The new feature can be any functionality associated with the portal application. Adding a new feature can also cause an addition or modification to the GUI, as explained in later stages. In one example, the feature can be a new application available to the user. The word "new" in this sense is used to mean merely that the application is newly available through the portal application. The push notification can be any sort of command, alert, notification, or function call received at a portal application or user device.

In some examples, the new feature is a new group of applications. The group of applications can correspond to a suite of related applications, such as a word processing application, spreadsheet application, and presentation application. In another example, the group of applications corresponds to the user's role within the company, such as the organizational group to which the user belongs. An organizational group can include all users within an enterprise-defined group. Examples include a sales group, accounting group, legal group, and research group. Each of those groups can correspond to a list of applications that should be available to users within the group. If a user changes from the sales group to the accounting group, for example, an administrator can configure options that revoke access to applications in the sales group and grant or retain access to applications in the accounting group. This change can be considered a new feature described by stage 110.

In some examples, the new feature can include a catalogue of applications being made available to the user. The catalogue can include web-based applications in one example. The web-based applications can be displayed through a browser or web view feature of the portal application. In another example, the catalogue can include applications supported by a remote server, referred to herein as an application-support server.

The new feature is not limited to a new or different set of applications, however. In some examples, the new feature includes the availability of SSO functionality with respect to some or all of the applications available through the portal application. More broadly, any functionality provided by an identity provider can be considered a new feature. An example identity provider is VMWARE IDENTITY MANAGER ("vIDM"). As explained in later stages, that new functionality can dynamically trigger GUI modifications and additions within the portal application.

The use of push notifications contributes to the portal application's dynamic nature. For example, stage 110 includes receiving a push notification at a user device. And as described in more detail with respect to FIG. 2, the push notification can be triggered based on a change made at the management server. For example, an enterprise administrator can access the management server through a console displayed in the browser of a computing device and, through the console, select an option to make a web-based-application catalogue available to a particular user. This selection can cause the management server to send an instruction to a notification service. The notification server can then generate a push notification and deliver it to the user device from a notification server. The notification can indicate to the user device that a new command is available for the user device to retrieve and carry out.

At stage 120, the user device can request commands from the management server. This can include requesting a command queue that includes multiple commands to be carried out by the device. The commands can be stored or delivered on behalf of the management server from a separate server that is remote from the management server, in some examples. The notification received at stage 110 can include instructions for accessing the command queue, such as by providing a uniform resource locator ("URL") that identifies a server location. At stage 130, the user device can receive the command, or command queue, and store it in a memory storage location.

At stage 140, the portal application can modify its GUI based on at least one of the received commands. In one example, the modification can include displaying a new application icon. Selecting the new application icon causes the associated application to be launched. In another example, the modification can include displaying a selection element that allows for selection of an application catalogue. The application catalogue can include one or more application icons corresponding to applications included in the catalogue. In some examples, these applications are supported by an application-support server. This server can run virtual machines, virtual instances of applications, and store application data to support the applications available through the catalogue.

In another example, the GUI modification can include applying badges to existing GUI elements, such as application icons. When an administrator requires a particular type of authentication for an application, for example, the portal application can display a badge in the corner of the icon corresponding to that application. The badge can resemble a lock or key to provide an indication of the stepped-up authentication requirement. In another authentication-based example, a badge is applied to application icons corresponding to applications that utilize an SSO functionality in order to perform authentication. For those applications, a valid SSO token can be used as a single form of authentication.

This stage can include modifying a piece of code, such as a script, associated with the portal application. For example, the portal application can automatically run a script provided by the command of stage 130. The script can apply to code within the portal application, such as code used to render the GUI of the application. The script can modify the code at stage 140. That is, the modification at stage 140 can be applied to the application without visually displaying the modification.

In one example, modifying the GUI can include inserting GUI pages into existing GUI workflows at stage 150. A script can be specific one or more GUI pages to insert into certain workflows as identified by the command at stage 130. For example, when SSO functionality is made available to the user, the portal application can insert multiple GUI pages for explaining and setting up the feature. Similarly, when authentication with an identity service is required, modifying the GUI can include inserting a GUI page related to authentication. The GUI page can include a first entry field for a user's email address or username and a second entry field for a password. In some examples, the GUI page that is displayed can be a redirect from the identity service itself. For example, the identity service can provide instructions to the portal application for displaying an appropriate GUI page. In other examples, the inserted GUI pages can explain new features, such as by identifying a new catalogue of applications available to the user and explaining how to access the catalogue.

At stage 160, the portal application can display the modified GUI. This stage can include displaying a new application icon in the existing GUI of the portal application. It can also include displaying a new GUI page having multiple new application icons, such as a page associated with an application catalogue. This stage can also include displaying a selection element allowing a user to access the application catalogue. In some examples, the selection element is a toggle that, when selected, toggles the GUI view between a first group of applications and a second group of applications. In other examples, this stage includes displaying badges on one or more application icons. In some examples, displaying the modified GUI at stage 160 comprises displaying an informational or authentication page, such as those described with respect to stage 150.

The GUI modification described at stages 140, 150, and 160 can be implemented automatically by the portal application without input from the user. In addition, the modification can be performed without needing to reinstall, upgrade, or change versions of the application. This can be accomplished by, for example, modifying code associated with the portal application. The code can be object information provided by an external source, such as a server. The code can provide information for generating and displaying GUI elements. The portal application can display a new group of icons by refreshing a GUI page that is currently displayed in the portal application. If the GUI page to be modified is not displayed at the user device at the time of the modification, the portal application can apply the modification upon the user navigating to the GUI page such that it is displayed on the user device. In examples where the portal application is closed or minimized to the background of the operating system, the modification can be applied when the portal application is launched or cycled to the foreground. The user need not update the application or even be aware of the modification.

Figure 2:
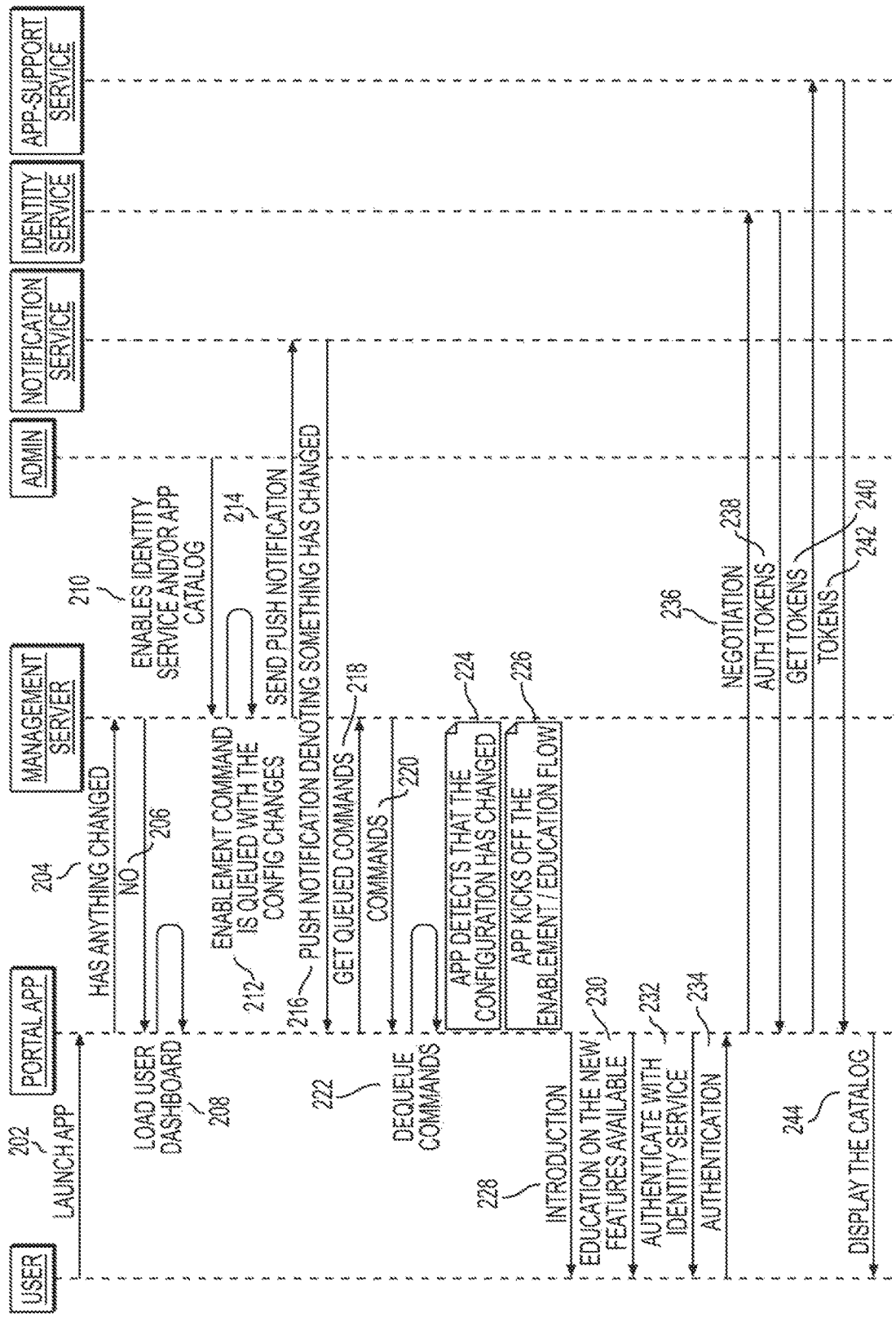
FIG. 2 is a sequence diagram of an example method for dynamically displaying features in a GUI of a portal application.

FIG. 2 provides a sequence diagram corresponding to a method for dynamically displaying features in a GUI of a portal application. At stage 202, a user can launch a portal application that is installed on the user's device. The portal application can be the same portal application described with respect to FIG. 1. In some examples, launching at 202 can include installing the portal application from an application store. Launching can also include cycling the portal application from the background of the operating system to the foreground of the operating system, for example by selecting the portal application to bring it up for display on the screen of the user device.

At stage 204, based on the portal application being launched or cycled to the foreground of the operating system, the portal application can contact the management server to determine whether anything has changed with respect to settings, configurations, or other information relevant to the portal application. The portal application can do so by making an application programming interface ("API") call to the management server or by accessing the management server at a URL designated for this type of check-in procedure. In the example of FIG. 2, the management server responds in a manner indicating that no changes are required for the portal application at stage 206. If the management server responds in a manner indicating that a change is required, the method can skip to element 218. The portal application can then retrieve any queued commands and proceed from there.

Otherwise, if no changes are required, the portal application can load the user dashboard at stage 208. In some examples, the user dashboard is a GUI page, or group of pages, displayed by the portal application and used as a "home" page of the application. The user dashboard can include application icons for certain applications, links to user information and settings, and any features that were previously enabled by the management server and implemented by the portal application. The user can access these features after they are displayed at stage 208.

In this example, at stage 210 an administrator enables features at a console that is communicatively coupled to the management server. The administrator can, for example, enable authentication with an identity service for certain applications. If one or more applications provided through the portal application support SSO, then the feature can include setting up an SSO token and using it for authentication across those applications. The administrator can also enable an application catalogue, such as the catalogue described with respect to FIG. 1. These changes can be made using GUI elements of the console, which can cause the console to communicate an instruction to the management server at stage 210. These GUI elements are shown and described in more detail with respect to FIGS. 4-6.

At stage 212, the management server can queue an enablement command. The enablement command can be a command that includes instructions for modifying a configuration of the portal application to enable the feature or features selected by the administrator at stage 210. For example, the command can include an instruction to modify the GUI of the portal application to display new or different information. The management server can store the command in a command queue. The command queue can include any commands that are ready to be delivered to the user device. When the user device checks in at a later stage, it can retrieve all available commands.

At stage 214, the management server can send a communication to a notification service. The communication can request that a push notification be delivered to the user device by the notification service. The notification service can be a standalone service for delivering notifications, such as the APPLE PUSH NOTIFICATION SERVICE ("APNS"). In some examples, the notification service is a server controlled by the management server. The notification service can push a notification to the user device at stage 216. The notification can include an indication that a command is available in the command queue. In some examples, the notification includes an indication that a configuration for the portal application has changed. The notification can also include instructions for retrieving the queued command, such as by providing a URL or API call to be used.

At stage 218, the user device can request queued commands from the management server, such as by accessing a URL associated with the management server or by making a relevant API call to the management server. The management server can deliver any or all of the queued commands to the user device at stage 220. At stage 222, the user device can dequeue the commands to prepare for execution of the individual commands. Although this stage is shown as being performed by the portal application, in some examples it can be performed by another aspect of the user device, such as a standalone agent application. However, in some examples the portal application is capable of dequeuing commands at stage 222.

Stage 224 can include detecting, at the portal application, that a configuration for the portal application has changed or should be changed. In some examples, this stage can include making the changes. For example, this stage can include modifying a piece of code, such as a script, associated with the portal application. The portal application can automatically run a script provided by the command of stage 130. The script can apply to code within the portal application, such as code used to render the GUI of the application. The script can modify the code at stage 224 to implement necessary changes.

At stage 226, the portal application can initiate an enablement or educational workflow. This workflow can be designed to educate the user with respect to newly enabled features or other changes to the portal application. In some examples, the workflow can also request information from the user in order to fully establish the new feature.

For example, stage 228 can include the portal application displaying an introductory GUI page to the user. The introductory GUI page can identify to the user that a new feature has been enabled within the portal application. For example, the GUI page can include text stating that "You can now use vIDM to login to your enterprise applications. Swipe right to learn more." The user can then swipe or use some other mechanism, such as the selection of a "next" button, to continue the workflow. The GUI page can be an entire GUI page that spans the entire GUI of the portal application, or it can be a box or window that spans only a portion of the GUI of the portal application.

The user can advance to stage 230 by providing appropriate input at stage 228. At stage 230, the portal application can display a GUI page with more detailed information about one or more new features. For example, this GUI page can explain how an identity service can be used to provide SSO abilities across certain applications. In another example, this GUI page can explain that a new catalogue of applications is now available to the user through the portal application, including instructions on how to access those applications. In yet another example, this GUI page can include a EULA that the user is required to agree to before accessing the new features.

In the example of FIG. 2, the new feature can include the ability to use an identity service to provide SSO. At stage 232 of this example method, the portal application can display a GUI page that includes elements for authenticating with the identity service. This stage can include displaying a web view provided by the identity service, for example. The web view can include entry fields for a username or email and an accompanying password. The user can enter this information into the GUI page at stage 234.

Stages 236 and 238 can include stages for retrieving one or more authentication tokens from the identity service based on the user credentials provided by the user at stage 234. For example, the portal application can provide the authentication information to the identity service at stage 236. The identity service can compare the credentials to information stored at a database accessible to the identity service to confirm the user's identity and credentials. After confirming these details, the identity service can return an authentication token to the portal application. The authentication token can be used to authenticate the user with additional services provided through the portal application, such as an application catalogue managed by the application-support server.

At stage 240, the portal application can request an access token from the application-support server. The request can include the authentication token provided by the identity service. The application-support service can crosscheck the authentication token with the identity service to confirm its authenticity. It can then issue one or more access tokens at stage 242. These tokens can be stored on the user device in a storage location accessible to the portal application. The portal application can then display the application catalogue at stage 244. This can include displaying icons for each application in the catalogue. When the user selects an icon from the catalogue, the portal application can provide an access token in order to automatically authenticate the user to the relevant application without requiring any intervention from the user.

Figure 3:
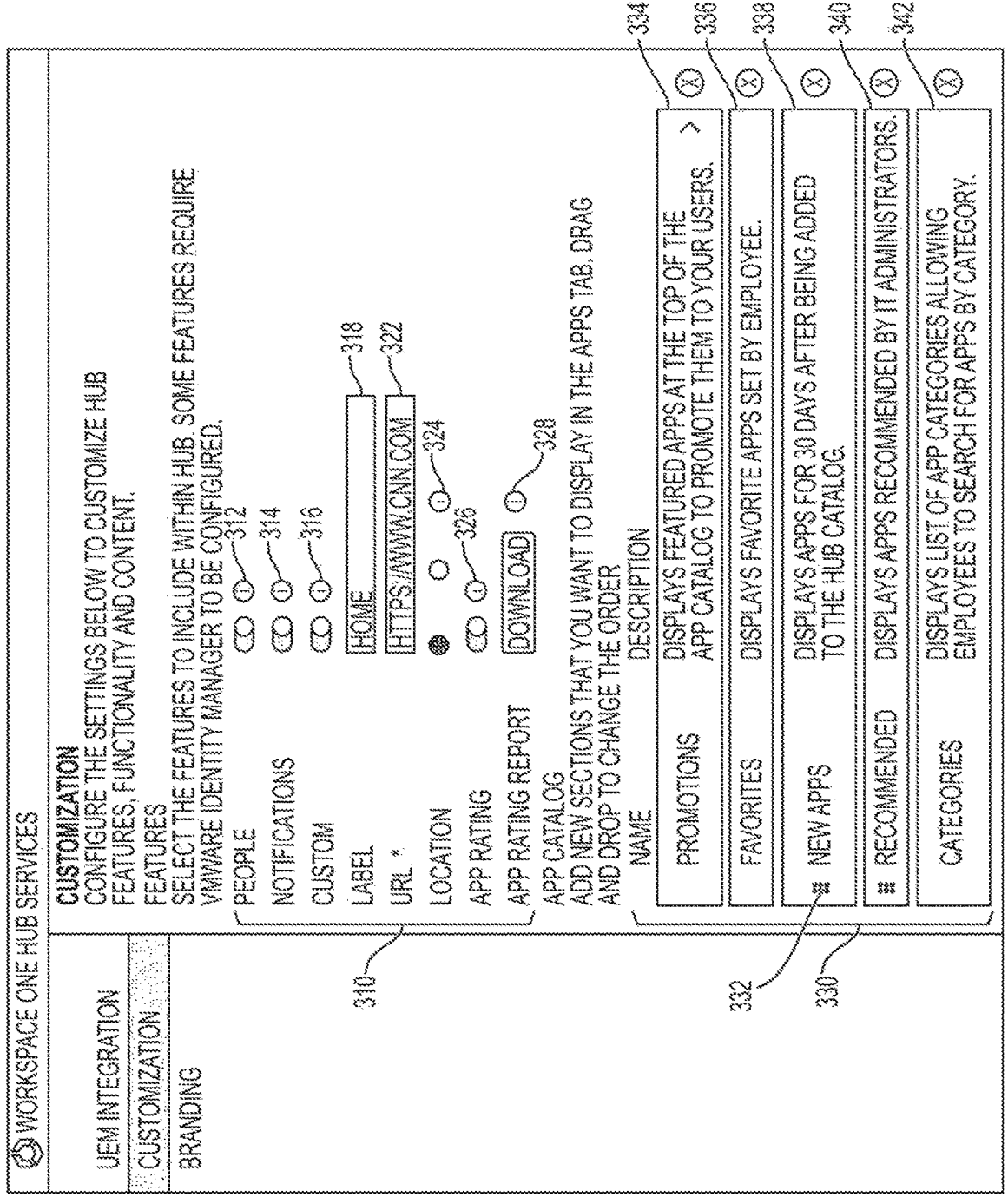
FIG. 3 is an illustration of an example GUI of a console that can be used to configure features for dynamic display within a portal application.
Figure 6:
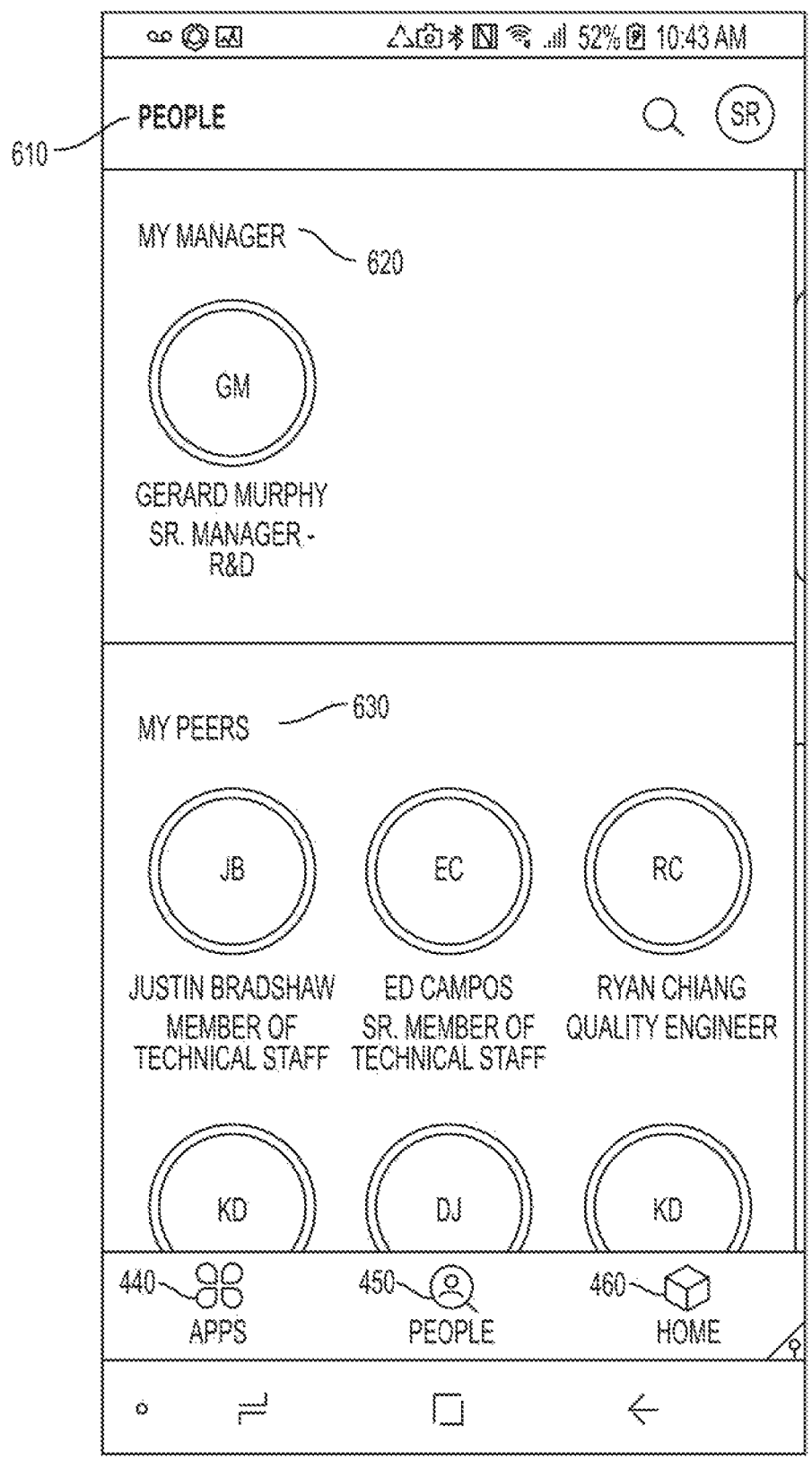
FIG. 6 is an illustration of an example GUI of a portal application that dynamically displays features.

FIG. 3 an illustration of an example GUI of a console that can be used to configure features for dynamic display within a portal application. In the console GUI, a features section 310 can include a variety of features available to turn on or off for the portal application. This this example, a people feature 312 is provided along with a slider element for turning the feature on or off. The people feature 312, when turned on, can cause the portal application to display a "People" tab that correspond to at least one GUI page within the portal application. An example tab and corresponding GUI page is shown in FIG. 6. The people feature 312 can provide information to the user regarding his or her own corporate information, department, contact number, and other related information. It can also provide information regarding the user's manager and peers within the enterprise. In some examples, the people feature 312 requires authentication with an identity service to be enabled for the user. Turning this feature on can cause the portal application to prompt the user for authentication with the identity service, if not done so previously, and to display the people tab and associated GUI page when that tab is selected. The people feature 312 and associated GUI are further described with respect to FIG. 6.

FIG. 3 also includes a notifications feature 314 along with a slider that can turn the feature on and off. The notifications feature 314 can cause a notification icon to be displayed on at least one page of the portal application's GUI, as shown with respect to FIG. 4. The notifications feature 314 can also cause badge icons to be displayed in conjunction with the notification icon, identifying a number of notifications available to the user. The user can select the notification icon to display a GUI window with more detailed information about the available notifications, as described in more detail with respect to FIG. 4.

The console GUI of FIG. 3 also includes a "custom" feature 316 that allows the administrator to add an additional tab within the GUI of the portal application. The custom feature 316, when selected by interacting with a slider element, can enable additional features 310 shown in FIG. 3. For example, the custom feature 316 can enable a label field 318, URL field 322, and location buttons 324. The label field 318 can correspond to the label for the tab within the portal application. As discussed with respect to FIG. 4, the tabs can remain visible even when the user is navigating to other tabs within the portal application. In this example, the administrator has named the feature "Home."

The URL field 322 can correspond to a website that is shown when the user selects the custom tab within the portal application. In this example, the administrator has entered https://www.cnn.com as the URL, but any URL can be entered here. This is described in more detail with respect to FIG. 5, which shows a Home tab corresponding to a VMWARE URL. The location buttons 324 can be used to select where in the portal application the custom tab is displayed. For example, the buttons 324 can be used to place the custom tab first or last among the other available tabs.

The features 310 of FIG. 3 can also include an app rating feature 326. The app rating feature 326 can allow a user to provide feedback on an application available through the portal application, such as by navigating to an informational page associated with an application and selecting a thumbs-up or thumbs-down icon displayed on the informational page. The app rating feature 326 can also display an enterprise-wide rating for individual applications available through the portal application. For example, the informational page associated with an application can include a number of "likes" and "dislikes." An app rating report button 328 can allow the administrator to download a report reflecting feedback received through the app rating feature.

Figure 4:
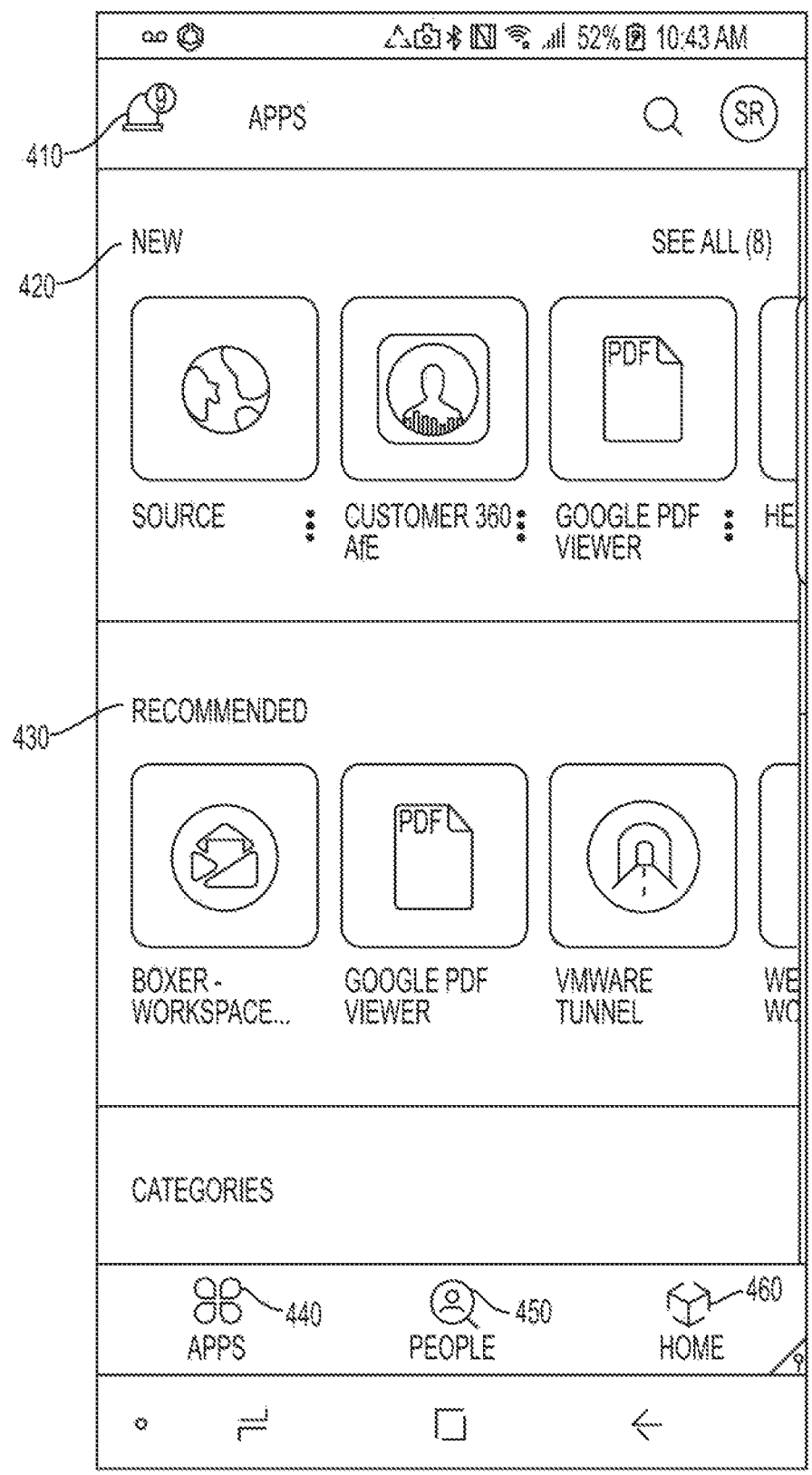
FIG. 4 is an illustration of an example GUI of a portal application that dynamically displays features.

The console GUI of FIG. 3 can also include sections 330 available to be displayed in the application catalogue of the portal application. Each of the sections 330 (individually corresponding to elements 334-342) can be individually selected by the administrator in this example. The sections 330 can correspond to groupings of application icons within the portal application as shown in FIG. 4. Application icons can be included in one section 330 or in multiple sections 330 at the same. The administrator can use a movement element 332 to drag and drop the various sections 330 and thereby change the order in which the selected sections 330 are displayed within the portal application. In one example, the movement elements 332 are displayed when a section 330 is selected.

In this example, a promotions section 334 can display featured applications. A favorites section 336 can display favorite applications that have been liked or identified as a favorite by the user. A new apps section 338 can display any applications added to the application catalogue within a predetermined period of time, such as 30 days. A recommended section 340 can display applications recommend to the user by the administrator. A categories section 342 can display a list of application categories that allow the user to search for applications by category. For each of these sections 330, the administrator can configure particular applications to be displayed when each section 330 is displayed within the portal application. In some examples, the administrator can configure rules for determining which application icons are displayed within each section 330.

FIG. 4 provides an illustration of an example GUI of a portal application. The GUI includes a notification icon 410 in the top left corner, corresponding to the notification icon described as being enabled by the notification feature 314 of FIG. 3. The notification icon 410 can display a badge that includes a number corresponding to the number of notifications available to the user at that time. The user can select the notification icon 410 to display a separate window or GUI page providing details regarding the notifications. In some examples, the user can select a notification and perform actions, such as launching an application that the portal application determines is relevant to the notification.

The portal application GUI of FIG. 4 also includes a row of tabs 440, 450, 460 across the bottom. The row of tabs 440, 450, 460 can remain displayed in this same position regardless of which tab 440, 450, 460 the user selects. In this example, the Apps tab 440 is selected. Accordingly, the GUI of the portal application is showing an application catalogue. In this example, the GUI is displaying two sections 420, 430 corresponding to the new apps section 338 and recommended section 340, respectively, of FIG. 3. The user can then scroll down to view other sections, if enabled at the console. In some examples, the full listing of available applications are displayed below the sections 420, 430.

Figure 5:
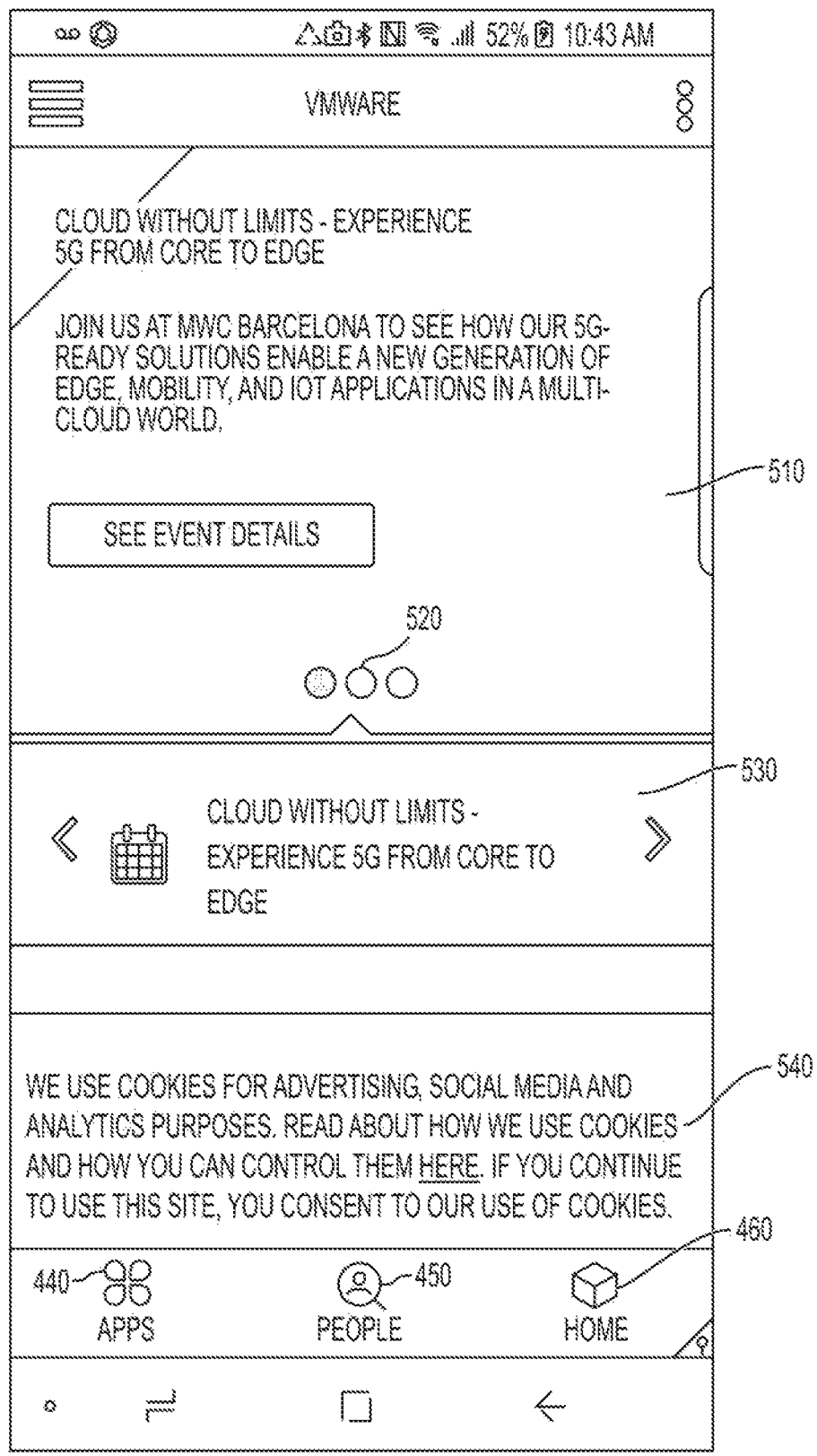
FIG. 5 is an illustration of an example GUI of a portal application that dynamically displays features.

Using the row of tabs 440, 450, 460 at the bottom of the GUI, the user can navigate between the Apps page, People page, and Home page. FIG. 5 shows an example GUI page of the portal application that can be displayed as a result of the user selecting the Home tab 460. As explained previous, while the tab 460 is labeled "Home" in FIGS. 4-6, the name can correspond to any name the administrator enters in the label field 318 of the console shown in FIG. 3. In this example, the Home tab 460 is displaying a VMWARE webpage corresponding to an announcement regarding a 5G event. The GUI elements on this page, such as the main GUI box 510, selection elements 520, summary element 530, and notice 540 can be displayed based on information received from the relevant URL entered in the URL field 320 of FIG. 3. In other words, these elements can depend on information received from the displayed website.

The user can also select the people tab 450 across the bottom of the portal application GUI to access a GUI page associated with the people feature 312 enabled through the console described in FIG. 3. This GUI page is depicted in FIG. 6. The GUI page includes a "People" label 610 across the top of the page and shows a highlighted version of the icon associated with the people tab 450 at the bottom. The GUI page can include a first section 620 showing information regarding the user's manager(s). In this example, an icon and associated text relating a Senior Manager of R&D is displayed in this section. In response to the user selecting the icon corresponding to the manager, the portal application can display additional information related to the manager, such as his or her email address, phone number, office location, and any other relevant information. This information can be populated using a directory service, such as ACTIVE DIRECTORY.

Similarly, the GUI page of FIG. 6 can include a peers section 630 corresponding to the user's colleagues at the enterprise. The individuals for which information is displayed in this section 630 can correspond to any kind of user group stored at the management server or at a directory service. For example, the peer group can include individuals in the same organizational group as the user. An organizational group can define a group of users that share some common trait. For example, an organizational group can include users that belong to the same company. In another example, the organizational group includes users that work in the same office building. Similarly, the group can include users that work on a particular floor of an office building. The organizational group can also relate to users' roles within an enterprise. For example, a sales group can include users within the sales department of an enterprise, while an accounting group can include users within the accounting department of an enterprise. Organizational groups can also relate to a users' role in terms of seniority within an enterprise, such as a first group for entry-level employees, a second group for mid-level managers, a third group for senior managers, and a fourth group for executives. In some examples, an organizational group can include a cross section of two or more organizational groups. For example, a Texas Accounting group can include users that belong to both a Texas organizational group (including employees located in a Texas office location) and an accounting organizational group (including employees in the accounting department). Any number of organizational groups can be cross-sectioned in this manner to form another organizational group.

An organizational group can be defined by an administrator through a console associated with the management server. The administrator can assign users to particular organizational groups in some examples. In other examples, the rules governing an organizational group can be entered through the console and the management server can parse user records to determine which users should belong to that organizational group. For example, a record associated with a user can include the user's office location, job title, management level, department, and any other relevant information. When the administrator enters instructions to form an organizational group based on specific information, the management server can search the user records for entries matching the specified information.

The groups shown in FIG. 6 can be based on one or more organizational groups. For example, the peer group can be based on an organizational group that relates to the department and management level of users within the enterprise. The administrator can define the parameters of the peer group by selecting one or more organizational groups at the console, for example. The user can select, in the portal application, any icons corresponding to individuals in order to display more information, which can be provided by the directory service in an example.

The features described above, such as those that can be enabled through the console shown in FIG. 3, can cause dynamic changes to the portal application using the methods described herein. For example, when an administrator turns a feature on or off, the portal application can automatically update the GUI accordingly using the methods described above. The changes in features can be applied to specific users, devices, or organizational groups. This can allow for dynamically updating GUIs for various portions of a workforce. For example, an administrator can enable a feature for a specific organizational group. The feature can include a suite of applications, such as finance and accounting applications. In that example, the administrator can enable the suite of finance and accounting applications for users within an accounting organizational group. In this way, the employees in the accounting department can gain access to useful accounting and finance application, but employees outside of that department will not. This not only increases the efficiency of the employees in the accounting department by providing useful applications, but avoids overloading other employees with applications that they do not need, which can lead to inefficiencies.

Figure 7:
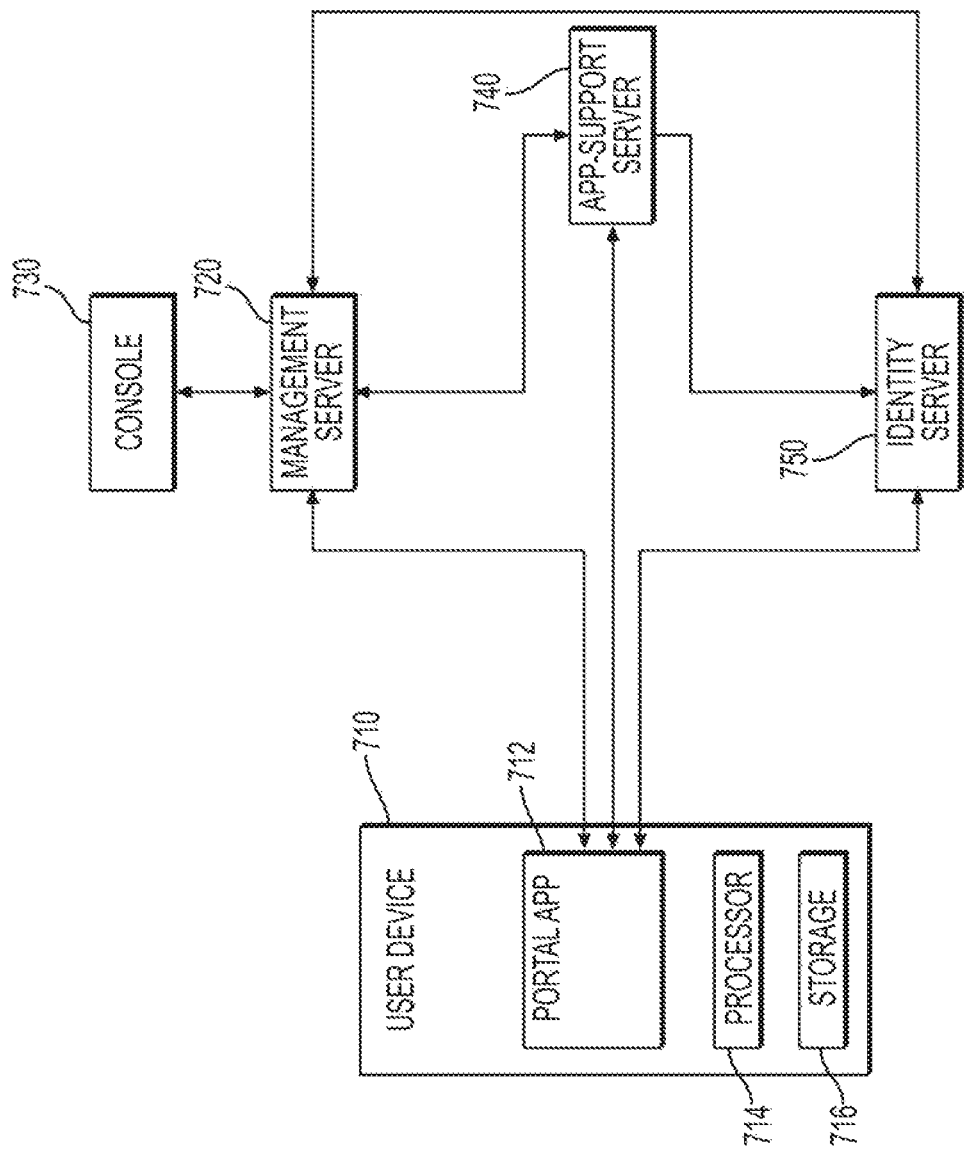
FIG. 7 is an illustration of a system for performing the methods disclosed herein.

FIG. 7 provides an illustration of a system for dynamically displaying features in a GUI of a portal application. The system can include a user device 710, which can be any type of computing device. Common examples of a user device 710 include laptop and desktop computers, phones, smartphones, and tablets. The user device 710 can include a processor 714, which can be a hardware processor such as a single- or multi-core central processing unit ("CPU"). The processor 714 can execute instructions stored in a non-transitory, computer-readable storage medium. For example, the instructions can be stored in a memory storage 716 location of the user device 710.

The user device 710 can include various applications such as applications provided by default with the operating system of the user device 710, applications downloaded from an application store, applications provisioned by a server or other component of a management system, and web-based applications. In this example, the user device 710 includes a portal application 712 that can be the example portal application describe above. As described in previous examples, the portal application 712 can be an application that facilitates access to other applications. The portal application 712 can provide a catalogue of application icons corresponding to different applications that are available to the user. The applications can be applications downloadable to the user device 710 or web-based applications, for example. The portal application 712 can selectively show application icons in the catalogue for those applications available to or authorized for the user. It can also provide authentication across those applications, for example by using SSO to provide authorization credentials to an application corresponding to a selected application icon.

The system can also include a management server 720. The management server 720 can be a single server or a group of servers having at least one processor. The management server 720 can include a storage location accessible to the server, either locally or remotely. The management server 720 can provide various management functions for a user device 710. For example, the management server 720 can handle an enrollment procedure that enrolls a user device 710 into the overall management system. An enrollment procedure can be instigated by contacting the management server 720 at a specific URL that triggers enrollment. The management server 720 can also provision applications and profiles to the user device 710. The profiles can be used to remotely control certain functionality of the user device 710, such as access to enterprise resources.

The management server 720 can communicate with the user device 710 through software on the user device 710, such as a standalone agent application or a portal application 712 that incorporates the functionality of an agent application. The portal application 150 can use authorization credentials to communicate securely with the management server 720 and can periodically send updates to the management server 720 that include device information. The management server 720 can use this device information to make determinations or take responsive actions.

The system can also include a console 730 with a user interface. The console 730 can be communicatively connected to the management server 720, such that input provided at the console 730 is communicated to the management server 720 automatically. The console 730 can be accessed through a browser application and displayed as a web page, for example. In other examples, the console 730 can be a dedicated kiosk-type device. An administrator can configure settings through the console 730, such as by creating a profile for a user or configuring one or more features for the user. The management server 720 can receive the configurations through the console 730 and take necessary actions, such as by informing the portal application 712 that a new feature is available or that a GUI modification is available, in one example.

The system can also include an application-support server 740 that supports the portal application 712. The application-support server 740 can maintain a database of applications that are supported by the portal application 712. It can also maintain a list of applications that the user is entitled to access from the user device 710. This list can be provided by the management server 720, an identity provider 750, or a combination thereof. The application-support server 740 can also communicate directly with the portal application 712. For example, the application-support server 740 can provide instructions regarding displaying certain pages or prompts within the GUI of the portal application 712. If a new application becomes available to the user and that availability is reflected at the application-support server 740, then the application-support sever 740 can provide an instruction to the portal application 712 to begin displaying an icon associated with the newly available application in the catalogue of the portal application 712.

The system can optionally include an identity provider 750. The identity provider 750 can be a server, or network of servers, that provides authentication services. An example identity provider 750 is VMWARE IDENTITY MANAGER. The identity provider 750 can store information about a user sufficient to identify and authenticate the user across various platforms. The identity provider 140 can generate tokens, for example, that reflect a successful authentication of a user. In some examples, the identity provider 750 can provide device-specific authentication such that the authentication corresponds to both a user and a particular user device 710. The identity provider 750 can be associated with or part of the management server 720 in some examples. In other examples, the identity provider 750 is omitted from the system and those responsibilities are handled by the management server 720 instead.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for dynamically displaying features in a graphical user interface (GUI) of a portal application installed on a user device, that displays a plurality of application icons associated with a plurality of applications and provides single-sign-on (SSO) access to the plurality of applications by providing authentication credentials to an application selected by the user from the plurality of applications, comprising:
   receiving, at the user device, a push notification from a notification service, the push notification indicating that a new feature is available for the portal application;
   using information from the push notification, requesting, from a management server, at least one command for modifying the GUI of the portal application to display the new feature;
   receiving, at the user device, the at least one command;
   modifying the GUI of the portal application based on the received command;
   displaying the modified GUI including the new feature, wherein the modified GUI comprises:
     a new application icon associated with a new application;
     a new applications section that includes the new application icon; and
     at least one additional section, different from the new applications section, that includes a grouping of application icons based on selections made through a different GUI associated with the management server, wherein the different GUI allows for grouping applications in the new applications section and the at least one additional section including at least one of a promotions section, a favorites section, a recommended section, and a categories section; and
   in response to a user selection of the new application icon, authenticating the user by providing the authentication credentials to the new application.

2. The method of claim 1, further comprising displaying, by the portal application, at least one page providing information on the new feature prior to displaying the modified GUI.

3. The method of claim 1, wherein the information from the push notification identifies an application programming interface (API) for requesting the at least one command.

4. The method of claim 1, further comprising requesting an authentication token from a remote server based on receiving the at least one command.

5. The method of claim 1, wherein the new feature is associated with an organizational group, and wherein the user device is associated with a user in the organizational group.

6. The method of claim 1, wherein the management server instructs the notification service to send the push notification to the user device.

7. The method of claim 1, wherein the new application icon is one of a plurality of new application icons displayed in a new application section of the modified GUI.

8. A non-transitory, computer-readable medium containing instructions that, when executed by a hardware-based processor, performs stages for displaying features in a graphical user interface (GUI) of a portal application installed on a user device, that displays a plurality of application icons associated with a plurality of applications and provides single-sign-on (SSO) access to the plurality of applications by providing authentication credentials to an application selected by the user from the plurality of applications, the stages comprising:
   receiving, at the user device, a push notification from a notification service, the push notification indicating that a new feature is available for the portal application;
   using information from the push notification, requesting, from a management server, at least one command for modifying the GUI of the portal application to display the new feature;
   receiving, at the user device, the at least one command;
   modifying the GUI of the portal application based on the received command;
   displaying the modified GUI including the new feature, wherein the modified GUI comprises:

a new application icon associated with a new application;

a new applications section that includes the new application icon; and at least one additional section, different from the new applications section, that includes a grouping of application icons based on selections made through a different GUI associated with the management server, wherein the different GUI allows for grouping applications in the new applications section and the at least one additional section including at least one of a promotions section, a favorites section, a recommended section, and a categories section; and in response to a user selection of the new application icon, authenticating the user by providing the authentication credentials to the new application.

9. The non-transitory, computer-readable medium of claim 8, the stages further comprising further comprising displaying, by the portal application, at least one page providing information on the new feature prior to displaying the modified GUI.

10. The non-transitory, computer-readable medium of claim 8, wherein the information from the push notification identifies an application programming interface (API) for requesting the at least one command.

11. The non-transitory, computer-readable medium of claim 8, the stages further comprising requesting an authentication token from a remote server based on receiving the at least one command.

12. The non-transitory, computer-readable medium of claim 8, wherein the new feature is associated with an organizational group, and wherein the user device is associated with a user in the organizational group.

13. The non-transitory, computer-readable medium of claim 8, wherein the management server instructs the notification service to send the push notification to the user device.

14. The non-transitory, computer-readable medium of claim 8, wherein the new application icon is one of a plurality of new application icons displayed in a new application section of the modified GUI.

15. A system for displaying features in a graphical user interface (GUI) of a portal application installed on a user device, that displays a plurality of application icons associated with a plurality of applications and provides single-sign-on (SSO) access to the plurality of applications by providing authentication credentials to an application selected by the user from the plurality of applications, comprising:

a memory storage including a non-transitory, computer-readable medium comprising instructions; and a computing device including a hardware-based processor that executes the instructions to carry out stages comprising:

receiving, at the computing device, a push notification from a notification service, the push notification indicating that a new feature is available for the portal application;

using information from the push notification, requesting, from a management server, at least one command for modifying the GUI of the portal application to display the new feature;

receiving, at the user device, the at least one command;

modifying the GUI of the portal application based on the received command;

displaying the modified GUI including the new feature, wherein the modified GUI comprises:

a new application icon associated with a new application;

a new applications section that includes the new application icon; and at least one additional section, different from the new applications section, that includes a grouping of application icons based on selections made through a different GUI associated with the management server, wherein the different GUI allows for grouping applications in the new applications section and the at least one additional section including at least one of a promotions section, a favorites section, a recommended section, and a categories section; and in response to a user selection of the new application icon, authenticating the user by providing the authentication credentials to the new application.

16. The system of claim 15, the stages further comprising displaying, by the portal application, at least one page providing information on the new feature prior to displaying the modified GUI.

17. The system of claim 15, wherein the information from the push notification identifies an application programming interface (API) for requesting the at least one command.

18. The system of claim 15, wherein the new feature is associated with an organizational group, and wherein the user device is associated with a user in the organizational group.

19. The system of claim 15, wherein the management server instructs the notification service to send the push notification to the computing device.

20. The system of claim 15, wherein the new application icon is one of a plurality of new application icons displayed in a new application section of the modified GUI.

* * * * *